(12) United States Patent
Adachi

(10) Patent No.: US 7,218,500 B2
(45) Date of Patent: May 15, 2007

(54) HIGH-VOLTAGE GENERATOR AND ACCELERATOR USING SAME

(75) Inventor: Shigeto Adachi, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 156 days.

(21) Appl. No.: 10/981,531

(22) Filed: Nov. 5, 2004

(65) Prior Publication Data

US 2005/0116690 A1 Jun. 2, 2005

(30) Foreign Application Priority Data

Nov. 28, 2003 (JP) .............................. 2003-398522
Feb. 10, 2004 (JP) .............................. 2004-033314

(51) Int. Cl.
*H02P 9/00* (2006.01)
*H03K 5/153* (2006.01)
*H05B 5/02* (2006.01)

(52) U.S. Cl. ........................................ 361/226; 322/45

(58) Field of Classification Search .................. 322/45
See application file for complete search history.

(56) References Cited

U.S. PATENT DOCUMENTS

| | | | | |
|---|---|---|---|---|
| 2,619,602 A | * | 11/1952 | Bennett et al. ............. | 307/110 |
| 3,237,068 A | * | 2/1966 | Sowiak ....................... | 361/235 |
| 3,337,784 A | * | 8/1967 | Holger ........................ | 361/231 |
| 3,644,747 A | * | 2/1972 | Gray ........................... | 307/106 |
| 3,694,659 A | * | 9/1972 | Ramsay et al. ........ | 250/214 VT |
| 3,742,852 A | * | 7/1973 | O'Keefe et al. ............. | 307/109 |
| 3,745,438 A | * | 7/1973 | Saeki .......................... | 363/126 |
| 3,936,719 A | * | 2/1976 | Miyoshi et al. ............. | 363/126 |
| 3,943,458 A | * | 3/1976 | Cohn .......................... | 330/42 |
| 4,028,596 A | * | 6/1977 | Weber ........................ | 361/235 |
| 4,029,995 A | * | 6/1977 | Itoh ........................... | 361/226 |
| 4,084,218 A | * | 4/1978 | Kenney ...................... | 363/18 |
| 4,189,650 A | * | 2/1980 | Aaland ........................ | 307/108 |
| 4,204,263 A | * | 5/1980 | Onoue ......................... | 363/68 |
| 4,210,949 A | * | 7/1980 | Masuda ...................... | 361/226 |
| 4,229,787 A | * | 10/1980 | Thibodeau .................. | 363/126 |
| 4,247,889 A | * | 1/1981 | Riechmann ................. | 363/126 |

(Continued)

FOREIGN PATENT DOCUMENTS

JP 6-76987 3/1994

(Continued)

OTHER PUBLICATIONS

Taiwanese Office Action for application No. 93133383 and english translation.*

*Primary Examiner*—Darren Schuberg
*Assistant Examiner*—Pedro J. Cuevas
(74) *Attorney, Agent, or Firm*—Oblon, Spivak, McClelland, Maier & Neustadt, P.C.

(57) ABSTRACT

In a high-voltage generator including a CW circuit (high-voltage circuit), where the CW circuit generates a high voltage through booster circuits that are provided for boosting an input voltage and connected to one another in multiple stages, a conductive shielding member for shielding electric circuit parts used for the CW circuit from an electrical discharge that occurs outside or inside the high-voltage generator is provided between the electrical circuit parts. Accordingly, the electric circuit parts are prevented from being damaged and/or burnt by the electrical discharge and the high-voltage generator is miniaturized.

15 Claims, 11 Drawing Sheets

U.S. PATENT DOCUMENTS

| | | | |
|---|---|---|---|
| 4,271,463 A * | 6/1981 | Tanimura et al. | 363/126 |
| RE31,119 E * | 1/1983 | Mitani et al. | 363/126 |
| 4,410,848 A * | 10/1983 | Frierdich | 322/25 |
| 4,437,147 A * | 3/1984 | Takamura et al. | 363/61 |
| 4,443,843 A * | 4/1984 | Ikeda et al. | 363/59 |
| 4,527,229 A * | 7/1985 | Imamura et al. | 363/126 |
| 4,541,910 A * | 9/1985 | Davis et al. | 204/464 |
| 4,584,637 A * | 4/1986 | Takamura et al. | 363/61 |
| 4,601,051 A * | 7/1986 | Santurtun et al. | 378/118 |
| 4,820,914 A * | 4/1989 | Allen | 250/207 |
| 4,860,185 A * | 8/1989 | Brewer et al. | 363/41 |
| 4,916,329 A * | 4/1990 | Dang et al. | 307/66 |
| 4,992,922 A * | 2/1991 | Ishimura et al. | 363/59 |
| 5,014,092 A * | 5/1991 | Kubo et al. | 399/409 |
| 5,060,253 A * | 10/1991 | Jedlitschka et al. | 378/101 |
| 5,151,631 A * | 9/1992 | Oda et al. | 315/127 |
| 5,295,036 A * | 3/1994 | Yagi et al. | 361/79 |
| 5,313,384 A * | 5/1994 | Takeda et al. | 363/60 |
| 5,363,019 A * | 11/1994 | Itatani et al. | 315/169.1 |
| 5,363,286 A * | 11/1994 | Tsuchiya | 363/8 |
| 5,453,610 A * | 9/1995 | Gibbons | 250/207 |
| 5,523,556 A * | 6/1996 | Meddaugh et al. | 250/214 VT |
| 5,673,107 A * | 9/1997 | Masuda | 399/50 |
| 5,701,004 A * | 12/1997 | Nakaya | 250/207 |
| 5,838,085 A | 11/1998 | Roesel, Jr. et al. | 310/113 |
| 5,943,524 A * | 8/1999 | Eom | 399/18 |
| 6,154,382 A * | 11/2000 | Kawahara et al. | 363/68 |
| 6,198,642 B1 * | 3/2001 | Kociecki | 363/37 |
| 6,208,095 B1 | 3/2001 | DiVergilio et al. | 315/505 |
| 6,324,081 B1 * | 11/2001 | Sakamoto et al. | 363/25 |
| 6,381,432 B1 * | 4/2002 | Hattori | 399/176 |
| 6,639,621 B2 * | 10/2003 | Tamaru | 347/257 |
| 6,759,766 B2 * | 7/2004 | Hiratsuka et al. | 307/110 |
| 6,763,606 B2 * | 7/2004 | Saida | 34/97 |
| 6,825,644 B2 * | 11/2004 | Kernahan et al. | 323/283 |
| 6,853,284 B2 * | 2/2005 | Nagai et al. | 336/83 |
| 6,894,463 B2 * | 5/2005 | Kernahan | 323/267 |
| 6,897,683 B2 * | 5/2005 | Kernahan et al. | 326/86 |
| 6,906,500 B2 * | 6/2005 | Kernahan | 323/225 |
| 6,906,502 B2 * | 6/2005 | Kernahan et al. | 323/282 |
| 6,909,266 B2 * | 6/2005 | Kernahan et al. | 323/282 |
| 6,912,139 B2 * | 6/2005 | Kernahan et al. | 363/41 |
| 6,917,188 B2 * | 7/2005 | Kernahan | 323/282 |
| 6,965,220 B2 * | 11/2005 | Kernahan et al. | 323/283 |
| 6,975,525 B2 * | 12/2005 | Kernahan | 363/98 |
| 6,979,987 B2 * | 12/2005 | Kernahan et al. | 323/283 |
| 7,002,328 B2 * | 2/2006 | Kernahan et al. | 323/283 |
| 7,019,506 B2 * | 3/2006 | Kernahan | 323/284 |
| 7,092,265 B2 * | 8/2006 | Kernahan | 363/65 |
| 7,095,220 B2 * | 8/2006 | Kernahan | 323/300 |
| 2003/0033726 A1 * | 2/2003 | Saida | 34/96 |
| 2003/0112297 A1 * | 6/2003 | Hiratsuka et al. | 347/58 |
| 2004/0075524 A1 * | 4/2004 | Nagai et al. | 336/208 |
| 2005/0040262 A1 * | 2/2005 | Nagai | 239/690 |
| 2005/0116690 A1 * | 6/2005 | Adachi | 322/45 |
| 2005/0179406 A1 * | 8/2005 | Harada et al. | 315/291 |

FOREIGN PATENT DOCUMENTS

| | | |
|---|---|---|
| JP | 6-140191 | 5/1994 |
| JP | 6-176891 | 6/1994 |
| JP | 6-283299 | 10/1994 |
| JP | 7-312300 | 11/1995 |
| TW | 441226 | 8/2001 |
| TW | 496612 | 7/2002 |

* cited by examiner

EXTERNAL INPUT
VOLTAGE PART

EXTERNAL INPUT VOLTAGE PART

HIGH-VOLTAGE GENERATOR AND ACCELERATOR USING SAME

BACKGROUND OF THE INVENTION

1. Field of the Invention

The present invention relates to a high-voltage generator for generating a high voltage transmitted to an accelerator for accelerating a charged particle, such as an ion and an electron, for example. Particularly, the present invention relates to a high-voltage generator that can prevent electrical circuit parts used therefor from being damaged by an electrical discharge and that can be reduced in size. The present invention further relates to an accelerator using the above-described high-voltage generator.

2. Description of the Related Art

In known high-voltage generators used for the accelerator for accelerating the charged particles, such as the ion and the electron, metal hoops (conductive annular members) disclosed in Japanese Unexamined Patent Application Publication No. 6-176891, for example, are provided outside a high-voltage circuit including a capacitor, a diode (rectifier element), and so forth. The use of the metal hoops allows for reducing the nonuniformity of an electric field formed by the high-voltage circuit, thereby reducing the occurrence of an electrical discharge.

In general, a Cockcroft-Walton circuit (hereinafter referred to as a CW circuit) is used in the known high-voltage generators. FIG. 5 shows a high-voltage generator 50 using a CW circuit 51. The CW circuit 51 includes a plurality of booster circuits 54 connected to each other in multiple stages, whereby a double-voltage circuit is formed. In this drawing, six booster circuits are provided in the CW circuit 51. Each of the booster circuit 54 includes diodes 52, capacitors 53, and so forth. As an input voltage is sequentially transmitted from the low-voltage side (the external-voltage input side) to the high-voltage side (an upward direction in FIG. 5), the input voltage is gradually boosted. Subsequently, a large potential difference is generated between a low-voltage part 56 and a high-voltage part 57 of the CW circuit 51, which makes an electric field around the CW circuit 51 non-uniform. Further, because of the non-uniform electric field, peripheral elements or the like around the CW circuit 51 are easily charged, which increases the possibility of the electrical-discharge occurrence between the peripheral elements, or the peripheral elements and electric circuit parts including the diodes 52, the capacitors 53, and so forth. For reducing the electrical-charge occurrence, a plurality of substantially annular metal hoops 58 is provided outside and around the CW circuit 51. The metal hoops 58 are provided at predetermined positions, so as to correspond to the booster circuits 54 with predetermined distances therebetween. Subsequently, the electric field around the CW circuit 51 becomes substantially uniform, which reduces the electrical-discharge occurrence caused by the non-uniform electric field. FIG. 6 is a schematic diagram of the known high-voltage generator including the metal hoops 58 and FIG. 7 is a sectional view taken along the line VII—VII.

In the case of a high-voltage power supply disclosed in Japanese Unexamined Patent Application Publication No. 7-312300, substrates connected to multistage booster circuits of a CW circuit are molded of a flexible insulation resin. Subsequently, the occurrence of an electrical discharge in the CW circuit reduces. Further, each of distances between the substrates decreases, whereby the high-voltage power supply is miniaturized.

In the known accelerators for accelerating the ion or the electron, a high-voltage circuit for transmitting a high voltage to an acceleration unit is provided outside an acceleration tube, which reduces spaces between the elements of the accelerator. However, since a predetermined distance must be provided between the acceleration tube and a high-voltage power supply for reducing the electrical-discharge occurrence, the proximity of the acceleration tube and the high-voltage power supply decreases, which hampers miniaturization of the high-voltage power supply.

More specifically, the above-described Cockcroft-Walton circuit, that is, a Cockcroft-Walton high-voltage power supply is often used, as the high-voltage circuit of the above-described accelerator. Usually, both the voltage of the Cockcroft-Walton high-voltage power supply and that of the acceleration tube for accelerating an ion and/or an electron by distributing the boosted potential are high. Further, an electrical discharge is likely to occur, where the proximity of the Cockcroft-Walton high-voltage power supply and the acceleration tube is increased without suitable preparation. Therefore, the high-voltage power supply and the acceleration power supply must be provided with a predetermined distance therebetween, which hampers miniaturization of the entire accelerator.

Although the known metal hoops disclosed in Japanese Unexamined Patent Application Publication No. 6-176891 can reduce the electrical discharge in the high-voltage circuit, such as the above-described CW circuit or the like, they are not sufficient enough for completely eliminating the electrical discharge. Accordingly, it was not possible to completely prevent the electric circuit parts used for the high-voltage circuit from being damaged or burnt by the electrical discharge. However, where distances between the electric circuit parts, or the peripheral elements and the electric circuit parts are increased, the insulation effect is enhanced and the electrical-discharge occurrence decreases. In that case, though the electrical circuit parts are prevented from being damaged and/or burnt, the high-voltage generator increases in size. Further, since voltages transmitted to the accelerator or the like have become increasingly high in recent years, so as to increase the energy of a charged particle such as an ion, the above-described electric circuit parts have become more likely to be damaged and/or burnt by an electrical discharge.

Where each of the substrates on which the booster circuits are formed is molded of the flexible resin, as in the case of the high-voltage power supply disclosed in Japanese Unexamined Patent Application Publication No. 7-312300, the substrates are prevented from being damaged and/or burnt by an electrical discharge. However, the cost and time required for the molding is so high that the use of the above-described high-voltage power supply is not economical.

SUMMARY OF THE INVENTION

Accordingly, it is an object of the present invention to provide a high-voltage generator that can easily prevent circuit elements of a high-voltage circuit from being damaged and/or burnt by an electrical discharge and that can be miniaturized.

It is another object of the present invention to provide an accelerator, wherein a distance between the above-described miniaturized high-voltage generator and an acceleration tube can be reduced. Subsequently, the accelerator can be miniaturized.

For achieving the above-described objects, the present invention provides a high-voltage generator comprising a high-voltage circuit that includes a first high-voltage part and a first low-voltage part, and that generates a high voltage through a plurality of booster circuits for boosting an input voltage, the booster circuits being connected to each other in multiple stages, and a first conductive shielding members for shielding a plurality of electrical circuit parts used for the high-voltage circuit from an electrical discharge that occurs outside or inside the high-voltage generator. The first shielding member is provided between the electrical circuit parts.

The first shielding member may preferably be provided, so as to correspond to each of the plurality of booster circuits connected in multiple stages.

Where the high-voltage generator further comprises at least one conductive annular member provided outside and/or inside each of the booster circuits for increasing the uniformity of an electric field of the booster circuit, a second shielding member may preferably be provided between the electric circuit parts and the annular member.

In that case, the second shielding member may preferably be provided, as a cylinder concentric with the annular member.

Further, the first and/or second shielding member may preferably be electrically connected to the electric circuit part.

Still further, the high-voltage circuit may preferably include at least one capacitor and the first and/or second shielding member may preferably be electrically connected to a positive electrode, or a negative electrode of the capacitor.

Further, the high-voltage generator may preferably include either a Cockcroft-Walton circuit or a multistage double-voltage rectifier circuit that can perform as well as the multistage double-voltage rectifier circuit, as the high-voltage circuit.

According to the configuration of the high-voltage generator of the present invention, the electrical circuit parts are prevented from being directly exposed to an electrical discharge that occurs between the electrical circuit parts. Therefore, it becomes possible to prevent the electric circuit parts from being damaged and/or burnt by the electrical discharge. Further, according to the configuration, it becomes possible to decrease electrical-discharge-prevention insulation spaces between the electric circuit parts, whereby the high-voltage generator is reduced in size. Subsequently, the consumption amount of an insulation gas such as SF6 filling the acceleration unit reduces, whereby an environmentally sound high-voltage generator is achieved. Further, the insulation gas filling the acceleration unit can be easily recovered.

Further, since the shielding members are provided, so as to correspond to the plurality of booster circuits connected to one another in multiple stages, insulation spaces between the booster circuits are reduced. Subsequently, the high-voltage generator can be reduced in size.

As has been described, in the high-voltage generator including said at least one conductive annular member provided outside and/or inside each of the booster circuits for increasing the uniformity of the electric field of the booster circuit, each of the shielding members is provided between the electric circuit parts and the annular member. Therefore, it becomes possible to reduce the insulation spaces between the electrical circuit parts and the annular members, so that the high-voltage generator is miniaturized.

Further, since each of the shielding members is provided, as the cylinder concentric with the annular member, electrical discharges from every direction caused by the annular members can be effectively prevented, which allows for protecting the electrical circuit parts from the electrical discharges. The above-cylindrical structure is considered to be the most excellent structure in terms of the size reduction of the high-voltage generator.

As described above, each of the shielding members is electrically connected to the electric circuit parts. Therefore, if an electrical discharge occurs, an electrical current flows to the electrodes of the electrical circuit parts, and the main bodies of the electrical circuit parts are not directly exposed to the electrical discharge. Therefore, the electrical circuit parts are effectively protected from the electrical discharge.

Further, the high-voltage circuit includes said at least one capacitor and each of the shielding members is electrically connected to the positive electrode or the negative electrode of the capacitor. Therefore, a discharge surge and a follow current after the electrical discharge are absorbed by the capacitor. Subsequently, other electrical circuit parts including diodes or the like are protected from the electrical charge, which prevents the electrical circuit parts from being damaged, for example.

An acceleration device according to the present invention comprises an acceleration unit including a second high-voltage part and a second low-voltage part that are used for accelerating an ion or an electron and ejecting the ion or the electron therebetween, and the above-described high-voltage generator. The high-voltage generator is provided outside the acceleration unit and transmits a high voltage to the second high-voltage part. Here, a voltage of the second high-voltage part is set to be substantially the same as a voltage of the first high-voltage part and a voltage of the second low-voltage part is set to be substantially the same as a voltage of the first low-voltage part. The acceleration unit is provided, so as to be substantially in parallel with the high-voltage generator, and the second high-voltage part is opposed to the first high-voltage part and the second low-voltage part is opposed to the first low-voltage part.

According to the above-described acceleration device, the length of from the second high-voltage part to the second low-voltage part can be set, so as to be substantially the same as the length of from the first high-voltage part to the first low-voltage part.

Further, a first part of the acceleration unit may preferably be provided at a first height that is the same as a second height of a second part of the high-voltage generator, where a first voltage of the first part is set to be the same as a second voltage of the second part.

In the above-described acceleration device, it is preferable that the acceleration unit further has a plurality of first voltage-setting units connected to each other in multiple stages and the high-voltage generator further has a plurality of second voltage-setting units connected to each other in multiple stages. Further, voltages of the first voltage-setting units may preferably be equivalent to voltages of the second voltage-setting units corresponding to the first voltage-setting units.

In the above-described acceleration device, the high-voltage generator may preferably be provided around the acceleration unit, as a cylinder concentric with the acceleration unit.

The first voltage-setting units may preferably be electrically connected to the second voltage-setting units corresponding to the first voltage-setting units.

According to the above-described configuration of the acceleration device, the voltage of the second high-voltage part is equivalent to that of the first high-voltage part opposed thereto and the voltage of the second low-voltage part is equivalent to that of the first low-voltage part opposed thereto. Therefore, where the acceleration device is brought near to the high-voltage generator, no electrical discharges occur therebetween, since voltages of the close parts of the acceleration device and the high-voltage generator are the same as each other. Subsequently, the high-voltage generator is reduced in size in the above-described manner and the acceleration unit can be provided near the high-voltage generator, whereby the acceleration device can be miniaturized and the amount of insulation gas used therefor can be reduced.

Further, in the acceleration device, the length of from the second high-voltage part to the second low-voltage part may preferably be substantially the same as the length of from the first high-voltage part to the first low-voltage part. Accordingly, the above-described effects can be obtained.

Further, since a first part of the acceleration unit is provided at a first height that is the same as a second height of a second part of the high-voltage generator, where a first voltage of the first part is set to be the same as a second voltage of the second part, it becomes possible to eliminate the electrical-discharge occurrence with stability.

Where the acceleration unit further has a plurality of first voltage-setting units connected to each other in multiple stages, the high-voltage generator further has a plurality of second voltage-setting units connected to each other in multiple stages, and voltages of the first voltage-setting units are equivalent to voltages of the second voltage-setting units corresponding to the first voltage-setting units, the occurrence of electrical discharge is further reduced.

Since the first voltage-setting units are electrically connected to the second voltage-setting units corresponding to the first voltage-setting units, it becomes possible to completely eliminate the possibility of an electrical discharge that occurs between the high-voltage generator and the acceleration unit.

In the above-described acceleration device, the high-voltage generator is provided around the acceleration device, so as to be a cylinder concentric with the acceleration device. The above-described cylindrical structure is considered to be the most excellent structure for miniaturizing the acceleration device.

DESCRIPTION OF THE PREFERRED EMBODIMENTS

The present invention will now be described with reference to what are considered to be the preferred embodiments. It is to be understood, however, that the technical scope of the invention is not limited to the following embodiments.

Figure 1:
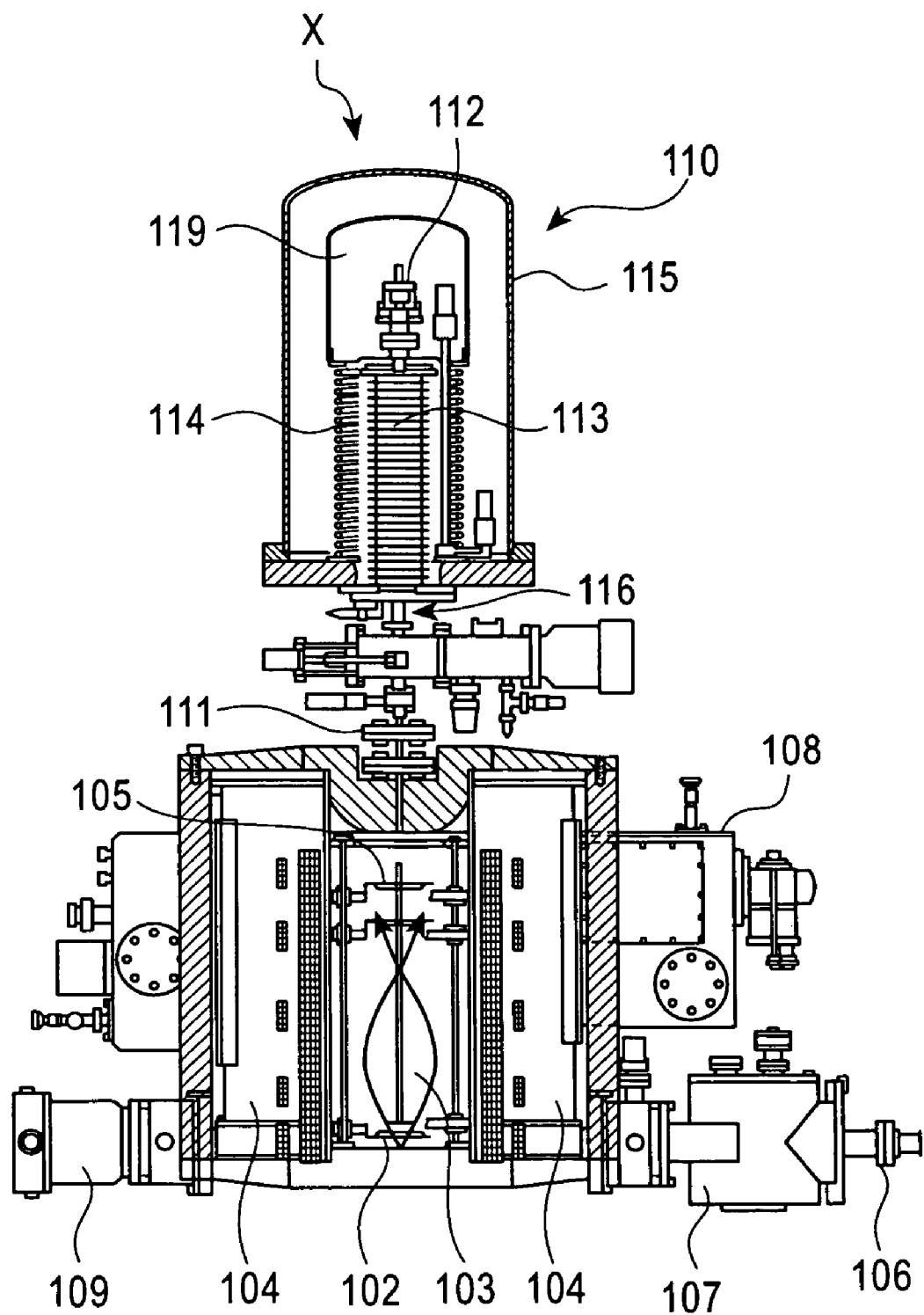
FIG. 1 shows the schematic configuration of a Rutherford backscattering analyzer including a high-voltage generator according to a first embodiment of the present invention.

FIG. 1 shows the schematic configuration of a Rutherford backscattering analyzer (hereinafter referred to as an RBS analyzer) X including a Cockcroft-Walton high-voltage generator 114 according to a first embodiment of the present invention. The RBS analyzer X is presented, as an example of the use of the high-voltage generator 114 for boosting an input voltage and generating a predetermined high voltage.

As shown in this drawing, the RBS analyzer X includes an acceleration device (accelerator) 110 provided vertically above a measurement chamber 103 (a vacuum container). In the measurement chamber 103, helium or the like transmitted from a gas cylinder (not shown) is ionized in an ion source 112 and a monovalent helium ion (an example charged particle) is generated. Then, the monovalent helium ion is transmitted to an acceleration tube 113. Since a high voltage is transmitted from the high-voltage generator 114 to the acceleration tube 113, a predetermined amount of energy corresponding to the transmitted high voltage is stored in the acceleration tube 113, so that the helium ion is accelerated. The accelerator 110 is filled with an insulation gas with high arc-suppression and insulation, such as SF6, so as to suppress an electrical discharge or the like caused by the high voltages.

The above-described high-voltage generator 114 is a Cockcroft-Walton high-voltage generator for boosting an input voltage to a predetermined high voltage through a CW circuit 51 (refer to FIG. 5) including a plurality of booster circuits 54 including PN diodes (example rectifier elements that are hereinafter referred to as diodes), capacitors, and so forth, where the booster circuits 54 are connected to one another in stages. It is to be understood that the CW circuit 51 is presented, as an example of the use of a high-voltage circuit. Therefore, the high-voltage generator 114 can be achieved by using a multi-stage double-voltage rectifier circuit in place of the CW circuit 51.

The ions accelerated in the acceleration tube 113 are emitted vertically downward and pass through a beam duct 116. Then, the ions are converged by a quadrupole magnet 111 so that a sample 102 in the measurement chamber 103 is irradiated with the ions, where the measurement chamber 103 is vertically under the accelerator 110.

After the irradiation, the ions are elastically scattered on the surface or inside the sample 102. Part of the ions is detected by a detector 105 and subjected to analysis.

The measurement chamber 103 is formed as a cylindrical measurement chamber. A turbo molecular pump 109 is provided near the measurement chamber 103, so as to evacuate air from the chamber. The measurement chamber 103 includes a detector 105 for detecting ions scattered from the sample 102 in a plurality of directions due to the above-described ion irradiation.

Further, a sample table for supporting the sample 102 is provided at a position that falls on the center axis (cylindrical axis) of the cylindrical measurement chamber 103. The sample table is centered on the center axis of the measurement chamber 103 and held, so as to be able to move upward and downward in a direction along the center axis of the measurement chamber 103. A transfer rod 106 for transferring the sample 102 to/from the sample table is provided outside the measurement chamber 103 and the hermeticity of the transfer rod 106 is maintained by a load lock chamber 107. Further, a superconducting magnet 104 cooled by a magnet cooler 108 is provided around the perimeter of the measurement chamber 103. The superconducting magnet 104 allows for changing the scattering direction of the scattered ions.

Figure 5:
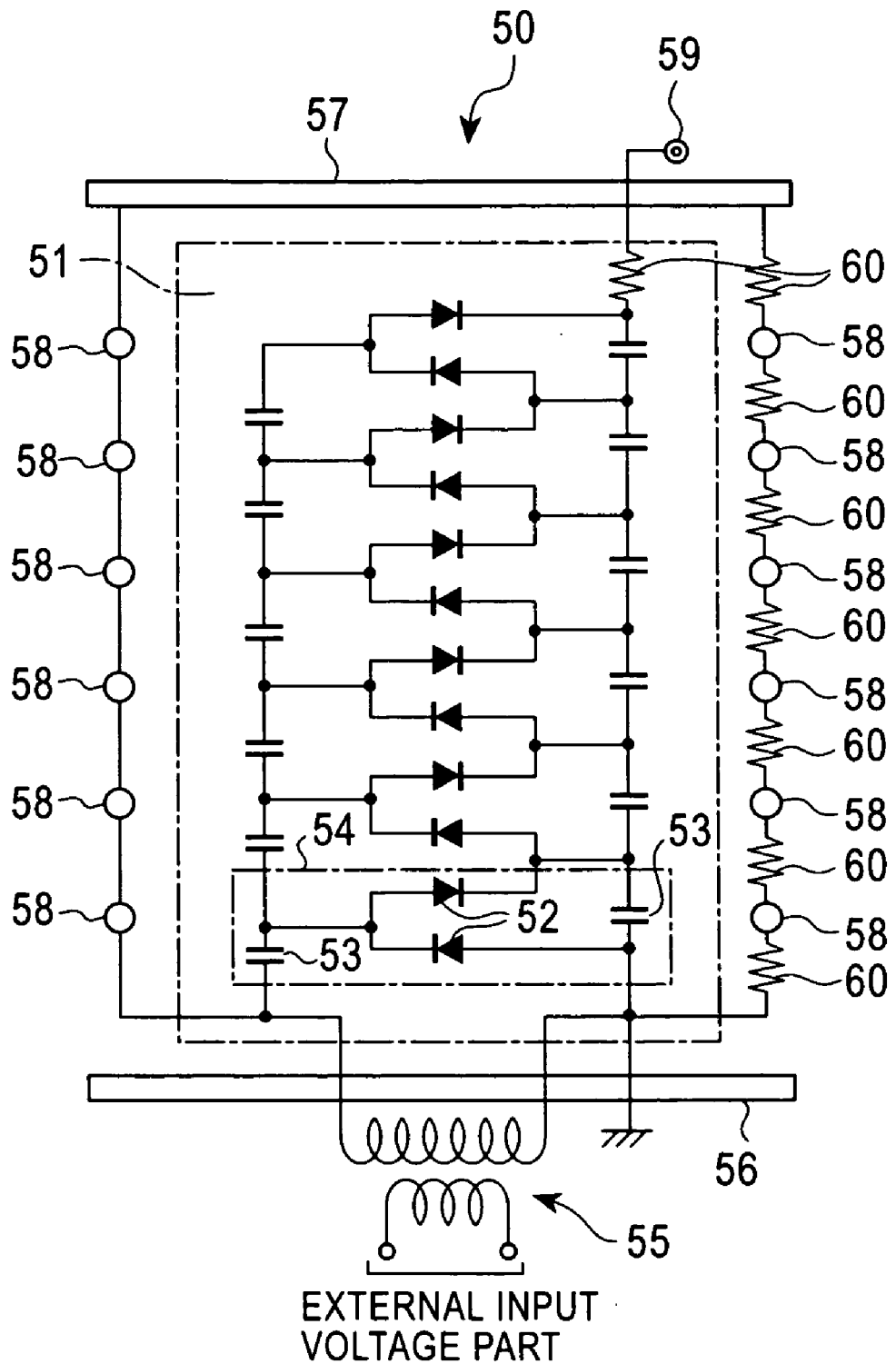
FIG. 5 is an equivalent circuit diagram of a high-voltage circuit of a known high-voltage generator.
Figure 6:
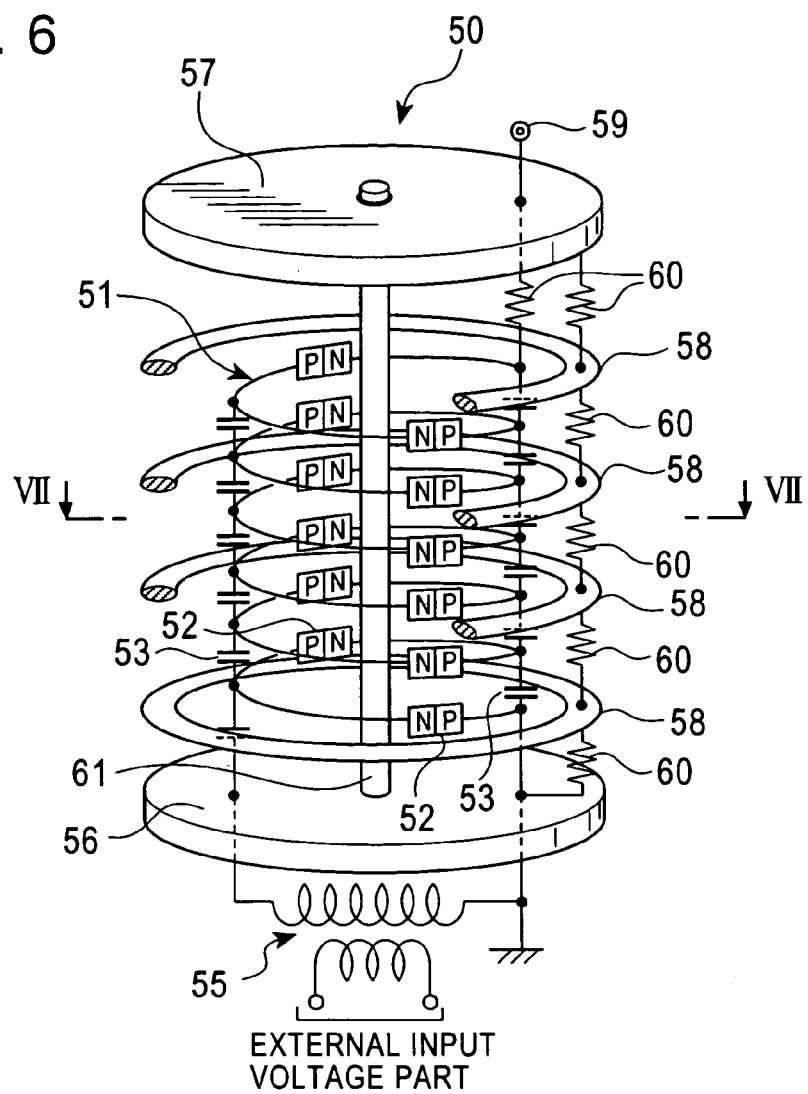
FIG. 6 is a schematic diagram of another known high-voltage generator.
Figure 7:
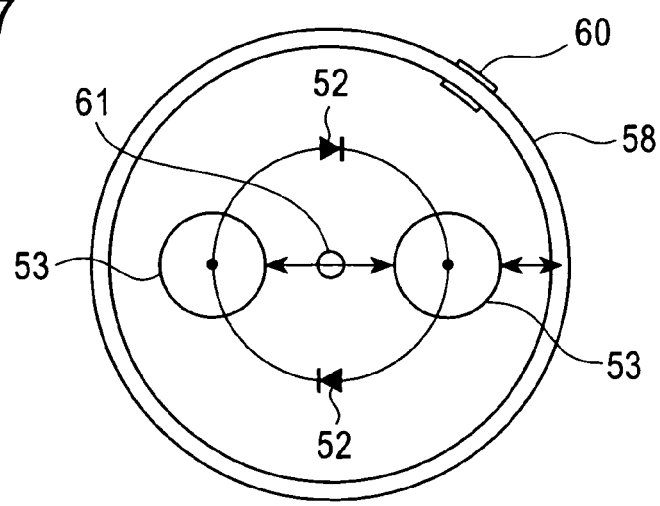
FIG. 7 is a cross sectional view taken along the line VII—VII shown in FIG. 6.

The configuration of the high-voltage generator 114 is substantially the same as that of the known high-voltage generator 50 shown in FIG. 5. The high-voltage generator 114 includes a low-voltage part 56 and a high-voltage part 47 that are held and insulated from each other by an insulation support member 61, a CW circuit 51 (a high-voltage circuit) provided between the low-voltage part 56 and the high-voltage part 57, a power transformer 55 that is provided under the low-voltage part 56 for transmitting an input voltage to the CW circuit 51, and a high-voltage terminal for transmitting a high voltage generated by the CW circuit 51 to the accelerator 110. The high-voltage generator 114 is provided in the accelerator 110, along with the acceleration tube 113, the ion source 112, and so forth (see FIG. 1).

The CW circuit 51 includes the plurality of booster circuits 54 for boosting an input voltage that is transformed and transmitted through the power transformer 55, where the booster circuits 54 are connected to one another in multiple stages. Therefore, the CW circuit 51 can generate a predetermined high voltage. Further, at least one conductive metal hoop 58 (an example conductive annular member) is provided outside the CW circuit 51 with a predetermined distance therebetween. The conductive metal hoops 58 are held by an insulation holding member (not shown). The metal hoops 58 may be provided inside the CW circuit 51.

The metal hoop 58 is separated from the other metal hoops thereabove and thereunder with predetermined distances therebetween. Further, the metal hoops adjacent to each other are connected to each other via a resistor 60. Further, the metal hoop 58 at the lowermost position is grounded for ejecting charges carried by the metal hoops 58 and making the metal-hoop potentials uniform, so that the metal-hoop potentials are approximately equivalent to the ground potential.

As has been described, the configuration of the high-voltage generator 114 is substantially the same as that of the known high-voltage generator 50. However, as shown in a perspective view of FIG. 2 and a sectional view of FIG. 3, the high-voltage generator 114 is different from the high-voltage generator 50 in that conductive shielding members 21a and 21b are provided between electric circuit parts and the metal hoops 58, where the electric circuit parts includes the diodes 52, the capacitors 53, and so forth, that are used for the CW circuit 51. That is to say, the conductive shielding members 21a and 21b are provided between the CW circuit 51 and the metal hoops 58. Further, this configuration is significantly different from that of the known high-voltage generator 50 in that the conductive shielding members 22a and 22b are provided between the electric circuit parts including the diodes 52, the capacitors 53, and so forth.

Accordingly, where an electrical discharge occurs, an electric current is discharged into the shielding member 21a or the like. That is to say, the above-described configuration allows for reducing a direct electrical discharge to the electric circuit parts including the diodes 52, the capacitors 53, the resistors 60 provided between the metal hoops 58, and so forth. Subsequently, the electrical circuit parts are prevented from being damaged and/or burnt by the electrical discharge. Further, the above-described configuration allows for reducing insulation spaces (insulation distance) between the electric circuit parts separated from one another for avoiding the electrical-discharge occurrence and another insulation space (insulation distance) between the electrical circuit parts and the metal hoops, whereby the entire high-voltage generator 114 can be reduced in size. Subsequently, the consumption amount of the insulation gas such as SF6 filling the accelerator 110 reduces, which facilitates recovering the insulation gas and achieves an environmentally sound high-voltage generator.

Since the shielding members 21a and 21b are electrically charged because of the above-described electrical discharge, each of the shielding members 21a and 21b may preferably be grounded. Further, since the potentials of the shielding members are maintained at the ground potential, the potential of the grounded metal hoop 58 becomes equivalent to those of the shielding members 21a and 21b. Subsequently, the electrical discharge between the metal hoop 58 and the shielding members 21a and 21b is reduced.

Figure 2:
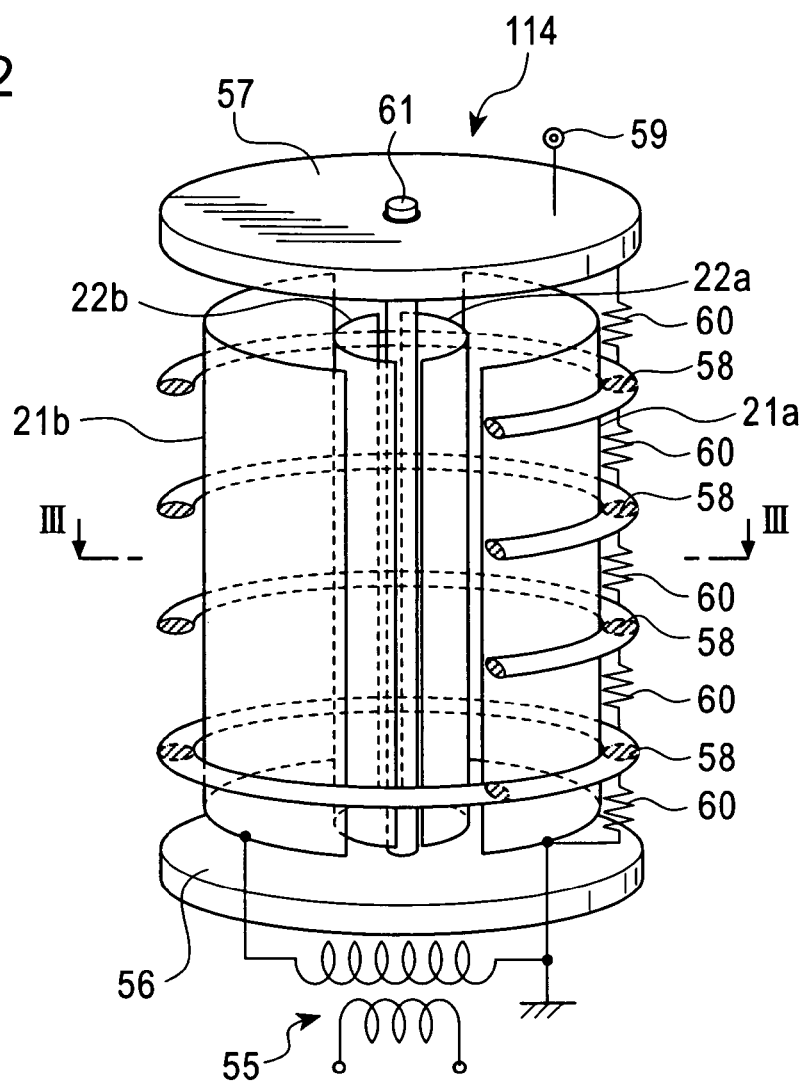
FIG. 2 is a schematic diagram of a high-voltage generator according to the first embodiment of the present invention.

Further, as shown in the drawings, the shielding members 21a and 21b are provided, so as to form a cylinder concentric with the metal hoops 58. Therefore, electrical discharges from every direction caused by the metal hoops 58 can be effectively prevented, which allows for protecting the electrical circuit parts from the electrical discharges. Further, the above-described cylindrical structure of the shielding members 21a and 21b shown in FIG. 2 is considered to be the most excellent structure in terms of miniaturization of the high-voltage generator 114.

Figure 3:
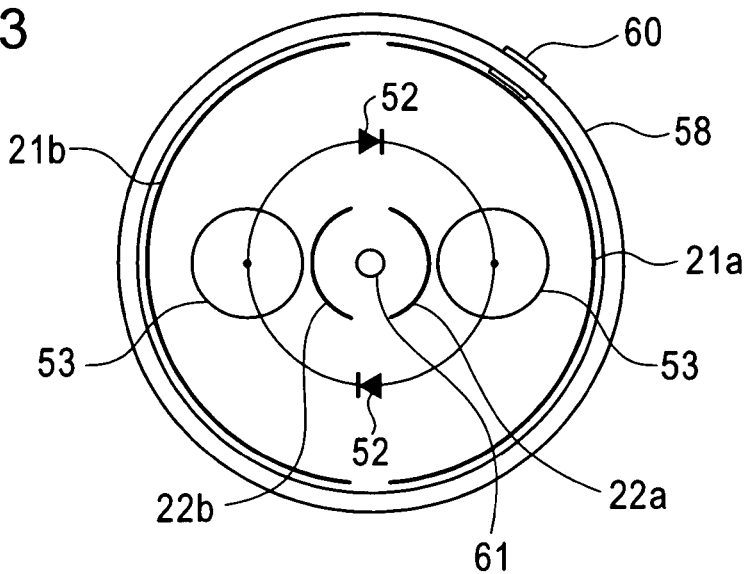
FIG. 3 is a cross sectional view taken along the line III—III shown in FIG. 2.

In this embodiment, the half-cylindrical shielding members 21a and 21b are provided, so as to face each other, and the half-cylindrical shielding members 22a and 22b are provided, so as to face each other, as shown in FIG. 3. However, it is to be understood that this embodiment does not limit the scope of the present invention.

That is to say, where the shielding members are provided between peripheral members including the accelerator 113 or the like and the electrical circuit parts that generate electrical discharges, the electrical circuit parts can be protected from being damaged. Therefore, the shielding member may be provided for each of the plurality of booster circuits 54 connected to one another in multiple stages (see FIG. 5). The above-described configuration allows for protecting the booster circuits 54 from being damaged by electrical discharges and reducing the insulation spaces between the booster circuits 54 and the insulation spaces between the booster circuits 54 and the metal hoops 58, whereby the high-voltage generator 114 can be reduced in size. Further, according to the above-described configuration, the shielding members are provided, so as to correspond to the booster circuits 54, respectively, and connected to one another via internal resistors or the like. Subsequently, the potentials of the shielding members are rendered uniform, which reduces the nonuniformity of the potentials and electric field in the high-voltage generator X. As a result, it becomes possible to effectively reduce electrical discharges.

Figure 4:
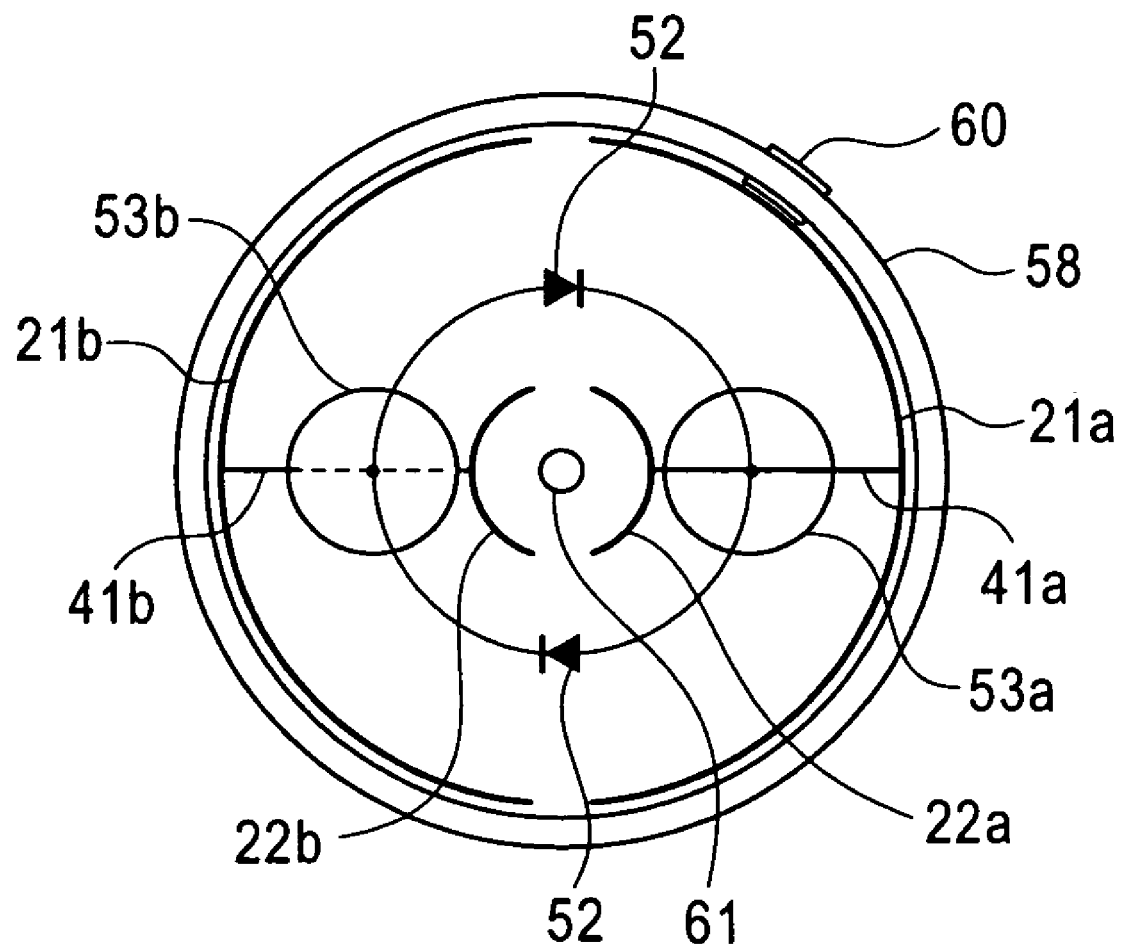
FIG. 4 is a cross sectional view of a high-voltage generator according to a second embodiment of the present invention.

According to a second embodiment of the present invention, the shielding members 21*a*, 21*b*, 22*a*, and 22*b* provided in the high-voltage generator 114 may be electrically connected to the electrical circuit parts, as shown in a sectional view of FIG. 4. More specifically, the shielding members 21*a* and 22*a* are connected to positive and negative electrodes of the capacitor 53*b* via wiring 41*b* or the like. Accordingly, if an electrical discharge occurs, an electrical current flows to the electrodes of the electrical circuit parts, so that the main bodies of the electrical circuit parts are not directly exposed to the electrical discharge. Therefore, the electrical circuit parts are effectively protected from the electrical discharge.

Further, since the shielding members 21*a*, 21*b*, 22*a*, and 22*b* are electrically connected to the capacitors 53*a* and 53*b* in the above-described manner, a discharge surge and a follow current after an electrical discharge are absorbed by the capacitors 53. Therefore, other electrical circuit parts such as the diodes 52, the resistors 60, and so forth, are protected from the electrical charge, which prevents the electrical circuit parts from being damaged, for example.

Next, an acceleration device according to a third embodiment of the present invention will be described. This acceleration device using the above-described high-voltage generator 114 can be miniaturized by reducing a distance between the high-voltage generator 114 and the acceleration tube 113.

In the high-voltage generator 114 shown in FIG. 1, the voltage of the acceleration tube 113, the voltages of a high-voltage part and a low-voltage part of the acceleration tube 113, and the voltages of a high-voltage part and a low-voltage part of a high-voltage power source are substantially or completely equivalent to one another, so that the high-voltage generator 114 can be provided near the high-voltage acceleration tube 113 regardless of its high voltage. The acceleration tube 113 and the high-voltage generator 114 are provided, so as to be substantially parallel to each other. Further, the high-voltage part of the acceleration tube 113 is provided, so as to be in parallel with the high-voltage part of the high-voltage generator 114 and the low-voltage part of the acceleration tube 113 is provided, so as to be in parallel with the low-voltage part of the high-voltage generator 114.

According to the above-described configuration, even though the voltage of the high-voltage generator 114 and that of the acceleration tube 113 are high, the voltage of a first part of the acceleration tube 113 becomes substantially or completely equivalent to that of a second part of the high-voltage generator 114, where the first part and the second part are opposed to each other. In that case, even though the acceleration tube 113 is provided near the high-voltage generator 114, there will be no voltage difference between adjacent parts of the acceleration tube 113 and the high-voltage generator 114. Subsequently, the electrical-discharge occurrence is reduced.

The above-described high-voltage generator 114 and acceleration tube 113 can be modified in various ways.

Figure 8:
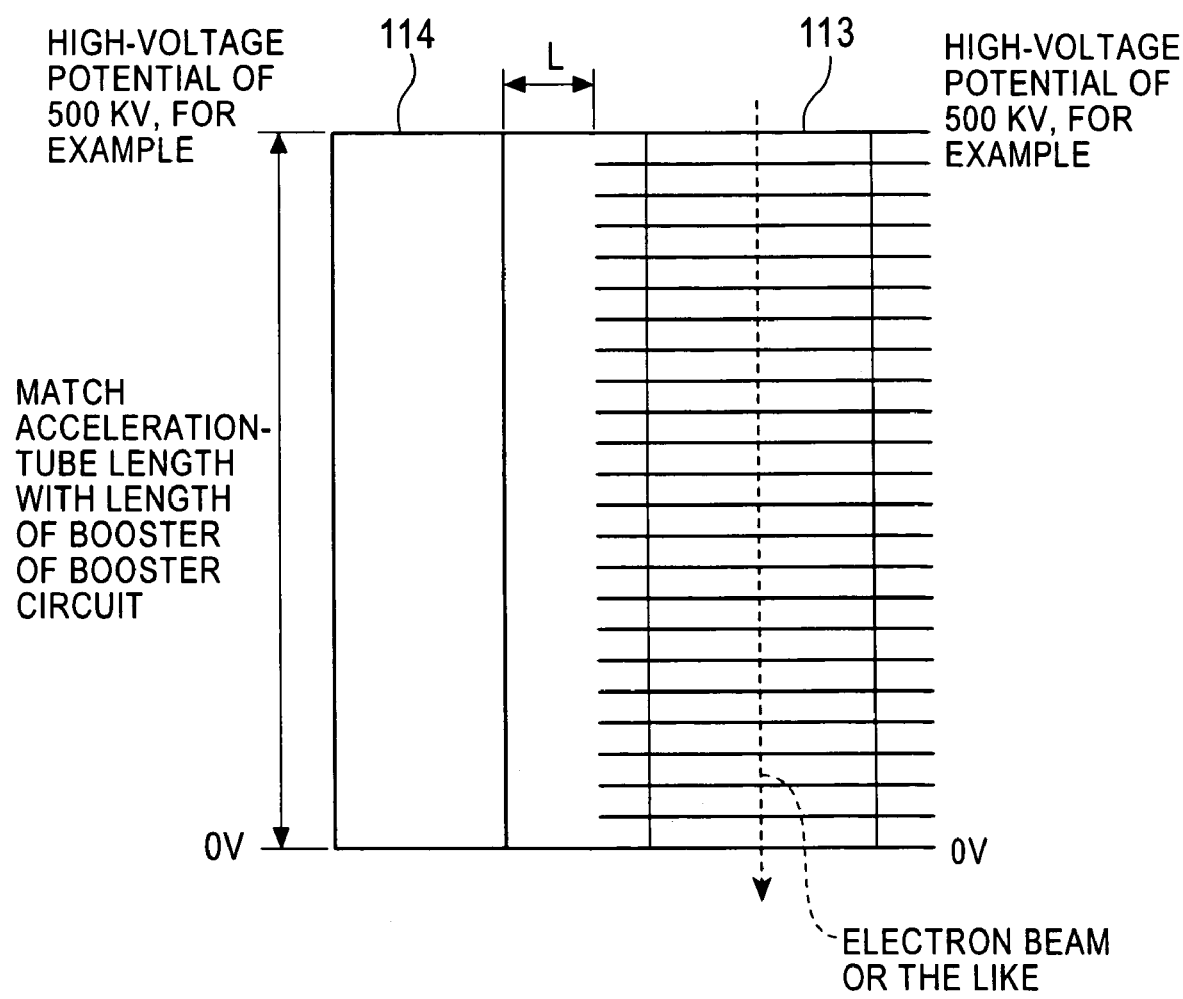
FIG. 8 is a conceptual illustration of a relationship between a high-voltage power supply and an accelerator according to a third embodiment of the present invention.
Figure 9:
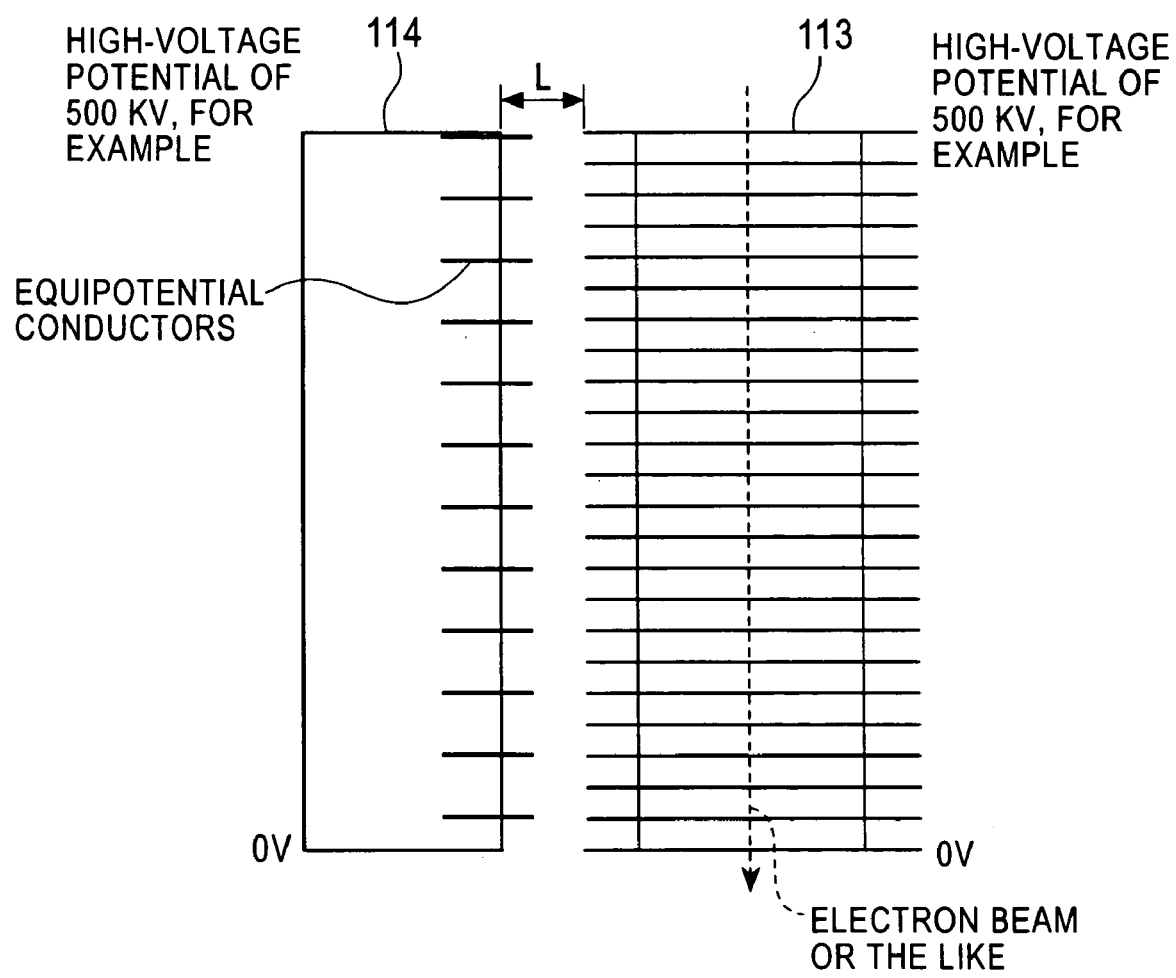
FIG. 9 is a conceptual illustration of another relationship between the high-voltage power supply and the accelerator according to the third embodiment of the present invention.
Figure 10:
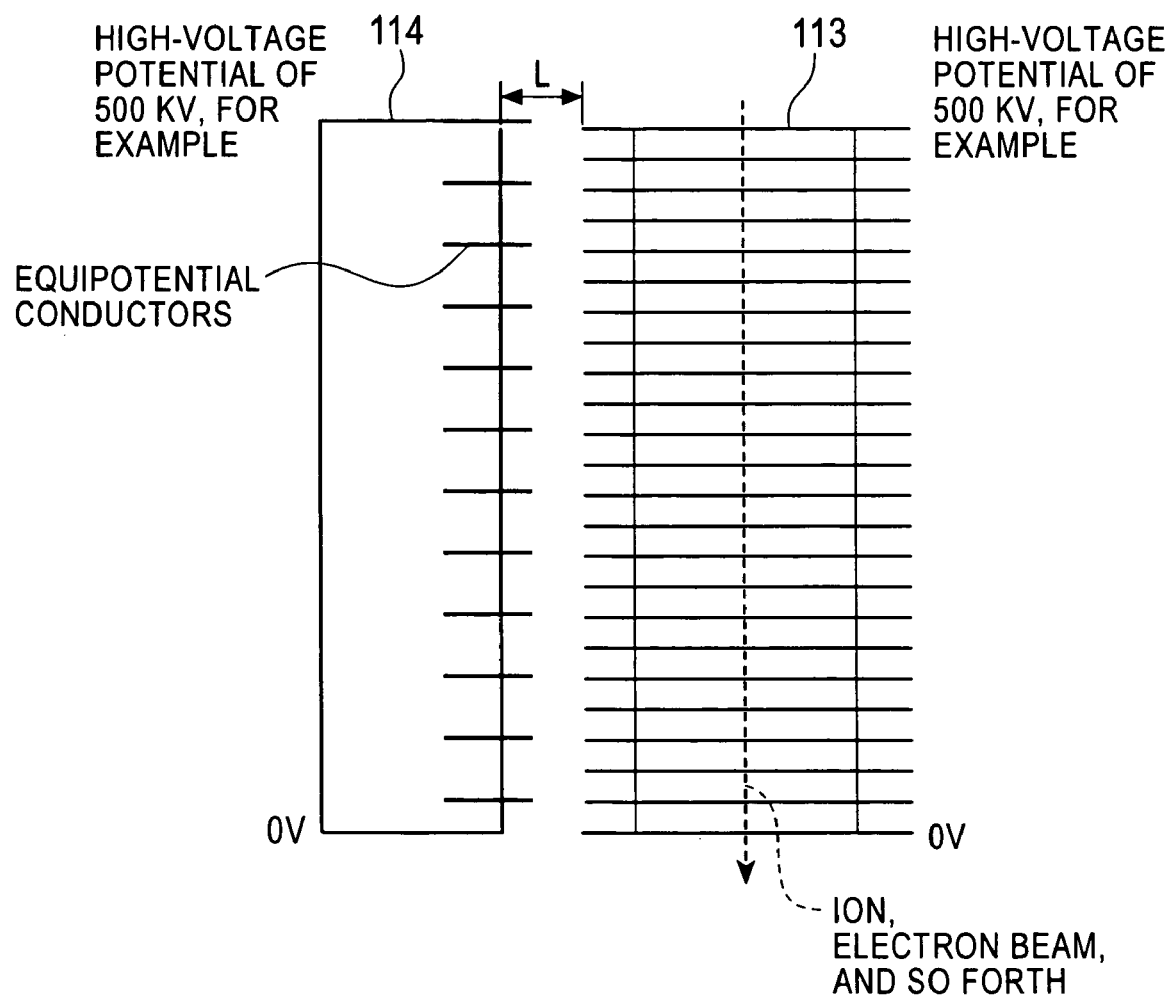
FIG. 10 is a conceptual illustration of another relationship between the high-voltage power supply and the accelerator according to the third embodiment of the present invention.

FIGS. 8 to 13 show example modifications of the high-voltage generator 114 and the acceleration tube 113. FIG. 8 schematically shows that the high-voltage generator 114 is provided outside the acceleration tube 113 and the length of the acceleration tube 113 is the same as that of a booster of the high-voltage generator 114. Further, as shown in FIG. 9, the high-voltage generator 114 includes conductors provided in an equipotential manner, as in the case of the multi-stage known conductors in the acceleration tube 113. In that case, the conductors in the acceleration tube 113 do not correspond to the conductors in the high-voltage generator 114. However, a conductor at the center of a booster part of the acceleration tube 113 is at the same height as that of a conductor at the center of the high-voltage generator 114, which establishes correspondences between the above-described two conductors. Further, the voltages of both the conductors match with each other. As a result, a first voltage at a first height in the acceleration tube 113 substantially or completely matches with a second voltage at the same height as the first height. Accordingly, even though the acceleration tube 113 is provided near the high-voltage generator 114, the occurrence of an electrical discharge therebetween can be substantially eliminated.

For further reducing a difference between the first voltage at the first height of the acceleration tube 113 and the second voltage at the second height of the high-voltage generator 114, where the first height is equivalent to the second height, the number of the conductors of the acceleration tube 113 may preferably be the same as that of the conductors of the high-voltage generator 114. Otherwise, the number of the conductors of the acceleration tube 113 may preferably be an integral multiple of that of the high-voltage generator 114. In another case, the number of part of the conductors of the acceleration tube 113 may preferably be an integral multiple of the number of corresponding part of the conductors of the high-voltage generator 114.

As has been described, the positions of predetermined conductors of the equipotential conductors of the high-voltage generator 114 agree with the positions of predetermined conductors of the conductors of the acceleration tube 113, whereby the potentials of the predetermined conductors of the high-voltage generator 114 match with those of the predetermined and corresponding conductors of the acceleration tube 113. Subsequently, it becomes possible to reduce the occurrence of an electrical discharge between the conductors with reliability and reduce the distance between the high-voltage generator 114 and the acceleration tube 113.

Figure 11:
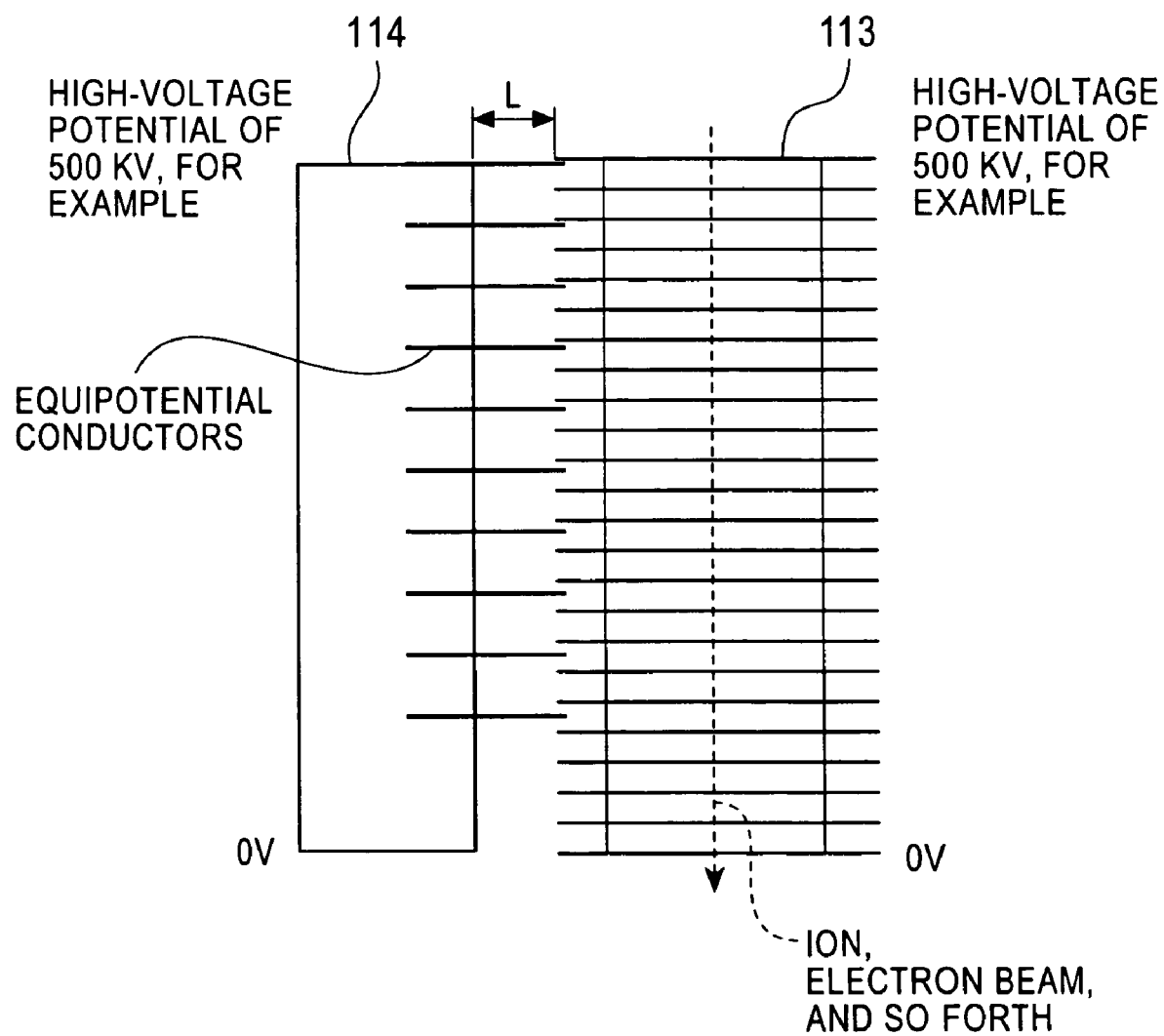
FIG. 11 is a conceptual illustration of another relationship between the high-voltage power supply and the accelerator according to the third embodiment of the present invention.

The equipotential conductors of the acceleration tube 113 and the high-voltage generator 114 may preferably be electrically connected to one another, so as to completely eliminate the occurrence of an electrical discharge between the acceleration tube 113 and the high-voltage generator 114. FIG. 11 is a conceptual illustration of the above-described configuration. In that case, the potential difference between the conductors of the acceleration tube 113 and the corresponding conductors of the high-voltage generator 114 is completely eliminated, which completely eliminates the electrical-discharge occurrence and reduces the accelerator 110 in size.

FIGS. 8 to 11 are the longitudinal vertical sections of the acceleration tube 113 and the high-voltage generator 114. In the case of the above-described drawings, the proximity of the acceleration tube 113 and the high-voltage generator 114 is increased from a vertical-section standpoint. However, the proximity can be increased in a three-dimensional manner, which allows for further miniaturizing the accelerator 110.

Figure 12:
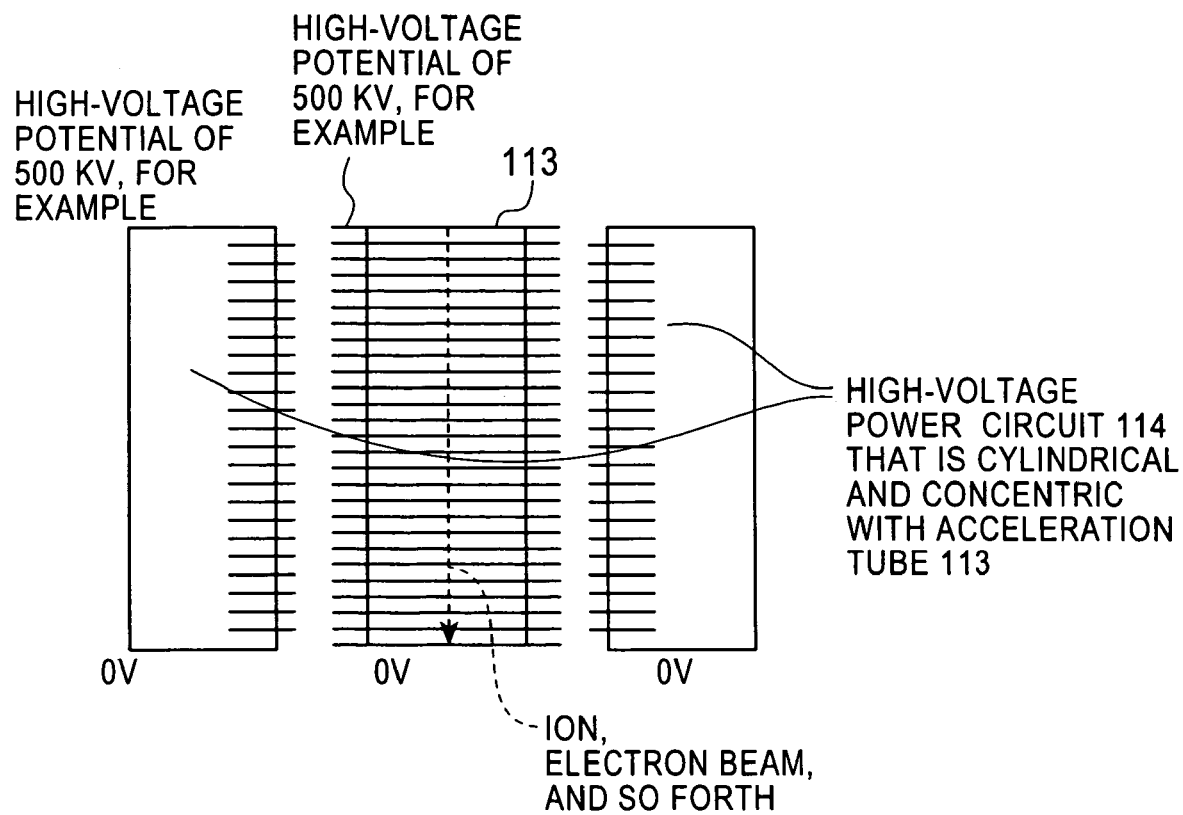
FIG. 12 is a conceptual illustration of another relationship between the high-voltage power supply and the accelerator according to the third embodiment of the present invention.

FIG. 12 illustrates the relationship between the acceleration tube 113 and the high-voltage generator 114 that are provided in the three-dimensional manner. As shown in this drawing, the high-voltage generator 114 is formed, as a cylinder concentrically surrounding the acceleration tube 113. That is to say, the cross section of the acceleration tube 113 and the high-voltage generator 114 shows that the acceleration tube 113 is horizontally concentric with the high-voltage generator 114. The above-described configuration allows for achieving the smallest accelerator from a three-dimensional standpoint.

Figure 13:
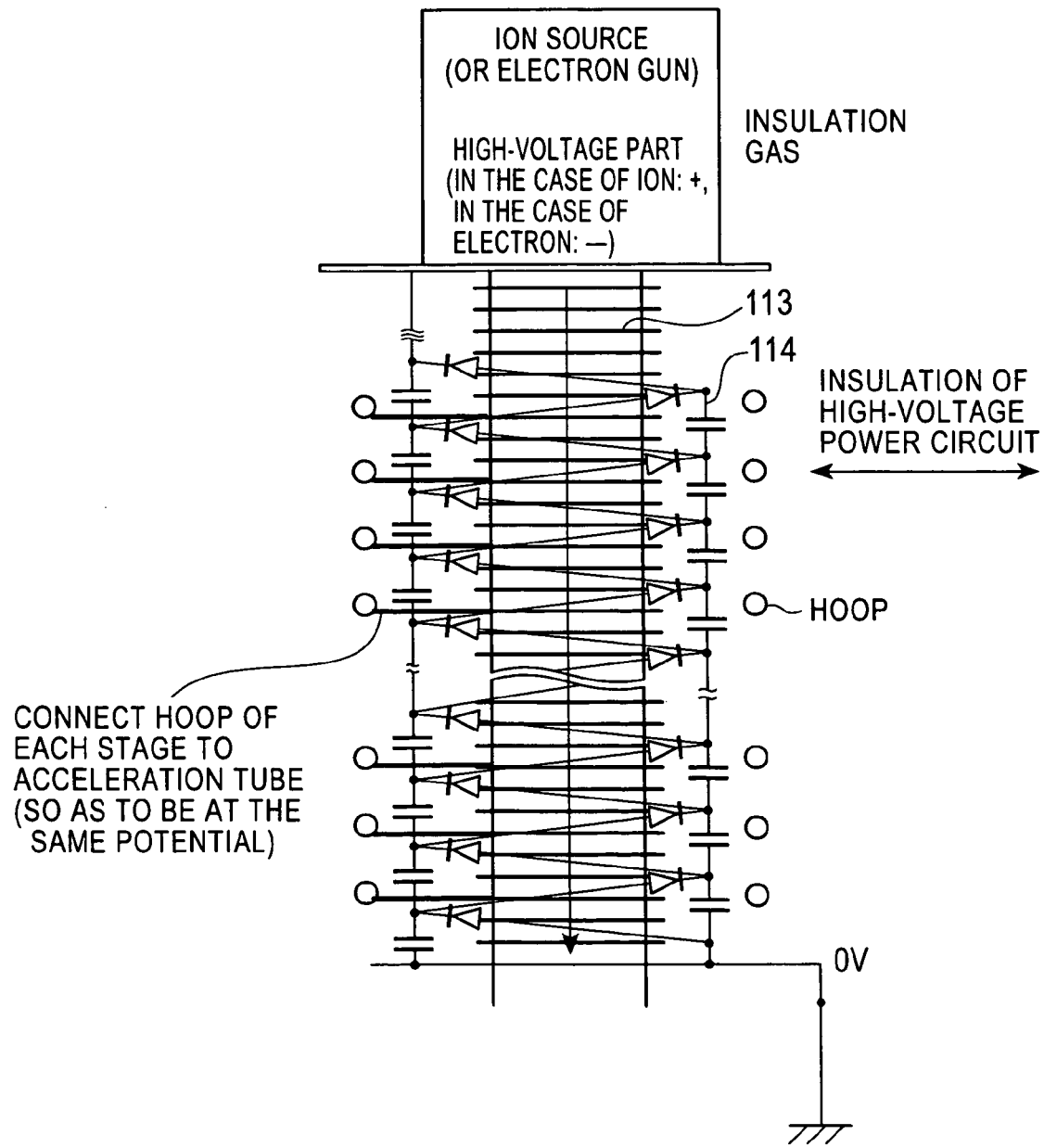
FIG. 13 is a conceptual illustration of another relationship between the high-voltage power supply and the accelerator according to the third embodiment of the present invention.

FIG. 13 shows an example circuit diagram of the acceleration tube 113 and the high-voltage generator 114 that are formed as cylinders concentric with each other.

In this drawing, the conductors of the acceleration tube 113 are connected to those of the high-voltage generator 114 at a ratio of four to one, as in the case of FIG. 11. Further, a Cockcroft-Walton circuit including at least one diode and at least one capacitor is used, as a high-voltage power circuit of the high-voltage generator 114. It is to be understood that the high-voltage power circuit is not limited to the Cockcroft-Walton circuit, but can be a circuit that performs as well as the Cockcroft-Walton circuit.

The present invention can be used for analyzers that can perform quantitative analysis and composition analysis for various materials such as a semiconductor material, ion implantation for implanting ions in a predetermined material, ion irradiation conducive to disinfection and other advantages by irradiating with ions and electrons, and machining by using ions and/or electron beams.

What is claimed is:

1. A high-voltage generator comprising: a high-voltage circuit that includes a first high-voltage part and a first low-voltage part, and that generates a high voltage through a plurality of booster circuits configured to boost an input voltage, the booster circuits being connected to each other in multiple stages; and
    a first conductive shielding member configured to shield a plurality of electrical circuit parts used for said high-voltage circuit from an electrical discharge that occurs outside or inside said high-voltage generator, wherein said first shielding member is provided between said electrical circuit parts used for said high-voltage circuit.

2. The high-voltage generator according to claim 1, wherein a plurality of said shielding members is provided, so as to correspond to each of said booster circuits.

3. The high-voltage generator according to claim 1, further comprising a conductive annular member provided at least one of outside and inside said booster circuits for increasing the uniformity of an electric field of said booster circuit, and a second shielding member provided between said electric circuit parts and said annular member.

4. The high-voltage generator according to claim 3, wherein said second shielding member is provided, as a cylinder concentric with said annular member.

5. The high-voltage generator according to claim 1, wherein said first shielding member is electrically connected to said electric circuit part.

6. The high-voltage generator according to claim 1, wherein said high-voltage circuit includes at least one capacitor and said first shielding member is electrically connected to a positive electrode, or a negative electrode of the capacitor.

7. The high-voltage generator according to claim 1, further comprising an electric-potential uniform unit for making electric potentials of said first shielding member substantially uniform.

8. The high-voltage generator according to claim 1, wherein said high-voltage circuit is formed, as a Cockcroft-Walton circuit, or a multistage double-voltage rectifier circuit that performs as well as the Cockcroft-Walton circuit.

9. An acceleration device comprising:
    an acceleration unit including a second high-voltage part and a second low-voltage part that are used for accelerating an ion or an electron and ejecting the ion or the electron therebetween; and
    the high-voltage generator according to claim 1, wherein the high-voltage generator is provided outside the acceleration unit and transmits a high voltage to the second high-voltage part,
    wherein a voltage of the second high-voltage part is set to be substantially the same as a voltage of the first high-voltage part and a voltage of the second low-voltage part is set to be substantially the same as a voltage of the first low-voltage part,
    wherein the acceleration unit is provided, so as to be substantially in parallel with the high-voltage generator, and
    wherein the second high-voltage part is opposed to the first high-voltage part and the second low-voltage part is opposed to the first low-voltage part.

10. The acceleration device according to claim 9, wherein the length of from the second high-voltage part to the second low-voltage part is substantially the same as the length of from the first high-voltage part to the first low-voltage part.

11. The acceleration device according to claim 9, wherein a first part of the acceleration unit is provided at a first height that is the same as a second height of a second part of the high-voltage generator, where a first voltage of the first part is set to be the same as a second voltage of the second part.

12. The acceleration device according to claim 9, wherein the acceleration unit further has a plurality of first voltage-setting units connected to each other in multiple stages and the high-voltage generator further has a plurality of second voltage-setting units connected to each other in multiple stages, and wherein voltages of the first voltage-setting units are equivalent to voltages of the second voltage-setting units corresponding to the first voltage-setting units.

13. The acceleration device according to claim 9, wherein the high-voltage generator is formed around the acceleration unit, as a cylinder concentric with the acceleration unit.

14. The acceleration device according to claim 9, wherein the first voltage-setting units are electrically connected to the second voltage-setting units corresponding to the first voltage-setting units.

15. The high-voltage generator according to claim 1, wherein the first conductive shielding member comprises a cylindrical member.

* * * * *